United States Patent [19]

Fix

[11] Patent Number: 5,234,233
[45] Date of Patent: Aug. 10, 1993

[54] HOSE/CLAMP ASSEMBLY WITH RUBBER BAND HOLDER

[75] Inventor: Sidney R. Fix, Lincoln, Nebr.

[73] Assignee: The Goodyear Tire & Rubber Company, Akron, Ohio

[21] Appl. No.: 997,746

[22] Filed: Dec. 30, 1992

[51] Int. Cl.5 .............................................. F16L 33/02
[52] U.S. Cl. ..................................... 285/23; 285/238; 285/242; 285/252
[58] Field of Search .................. 285/18, 23, 238, 242, 285/252, 253, 254; 206/805; 24/283, 304, 19, 20 R, 274 R, 276, 279

[56] References Cited

U.S. PATENT DOCUMENTS

| | | | |
|---|---|---|---|
| 2,102,010 | 12/1937 | Kopp | 285/253 |
| 3,365,218 | 1/1968 | Denyes | 285/253 |
| 3,407,449 | 10/1968 | Tetzlaff et al. | 285/253 |
| 3,955,656 | 5/1976 | Kashinski | 206/805 |
| 4,135,744 | 1/1979 | Fouts | 285/253 |
| 4,592,575 | 6/1986 | Hughes et al. | 285/252 |
| 4,882,814 | 11/1989 | Takahashi | 24/20 R |
| 5,002,094 | 3/1991 | Brovont | 285/252 |
| 5,185,913 | 2/1993 | Campo et al. | 285/253 |

FOREIGN PATENT DOCUMENTS

| | | | |
|---|---|---|---|
| 3543717 | 6/1987 | Fed. Rep. of Germany | 285/252 |
| 2630808 | 11/1989 | France | 285/253 |

Primary Examiner—Eric K. Nicholson
Attorney, Agent, or Firm—Marc R. Dion, Sr.

[57] ABSTRACT

A Hose/Clamp assembly is provided which is easily accomplished, inexpensive and greatly facilitates motor vehicle assembly. A clamp in its open position is located and oriented around a hose and secured in place by a rubber band.

2 Claims, 4 Drawing Sheets

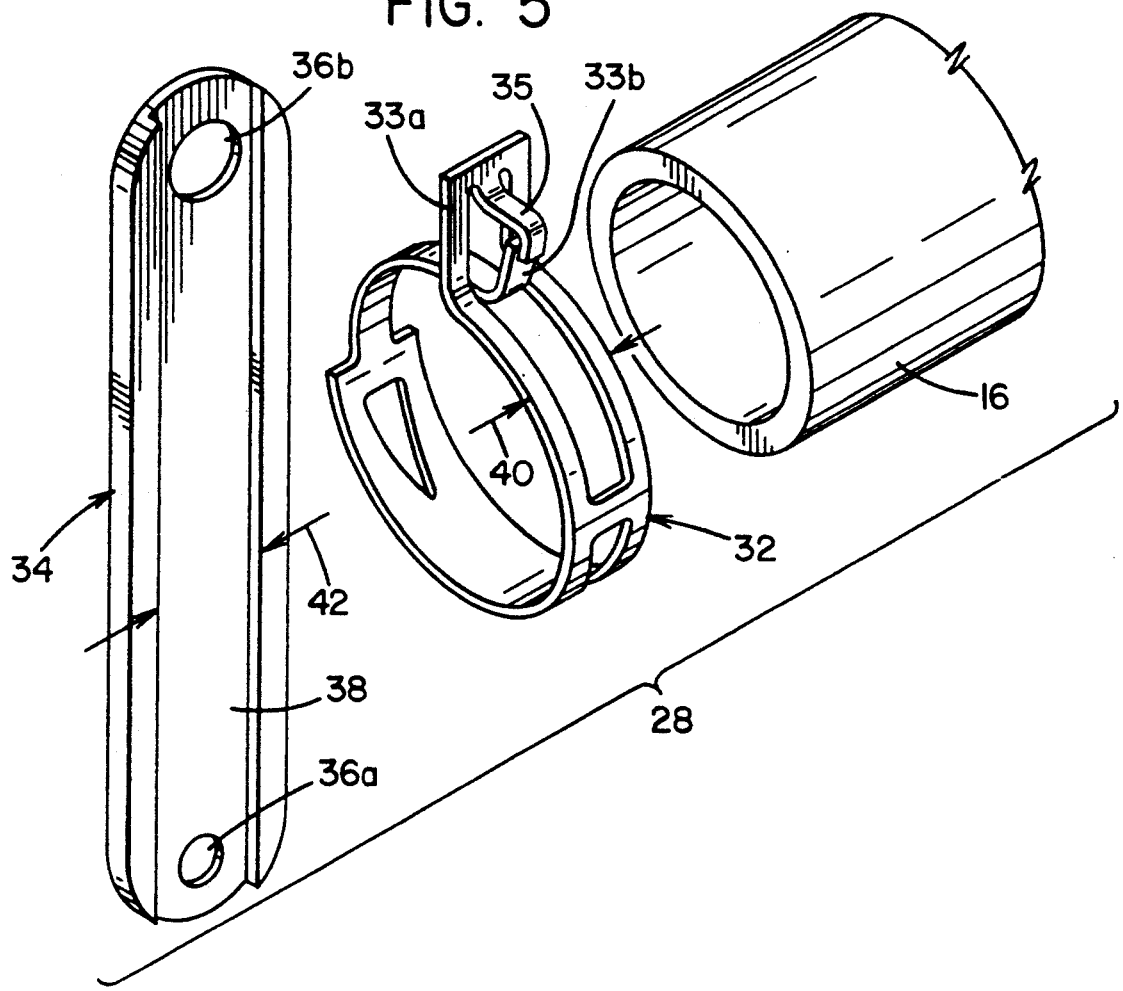
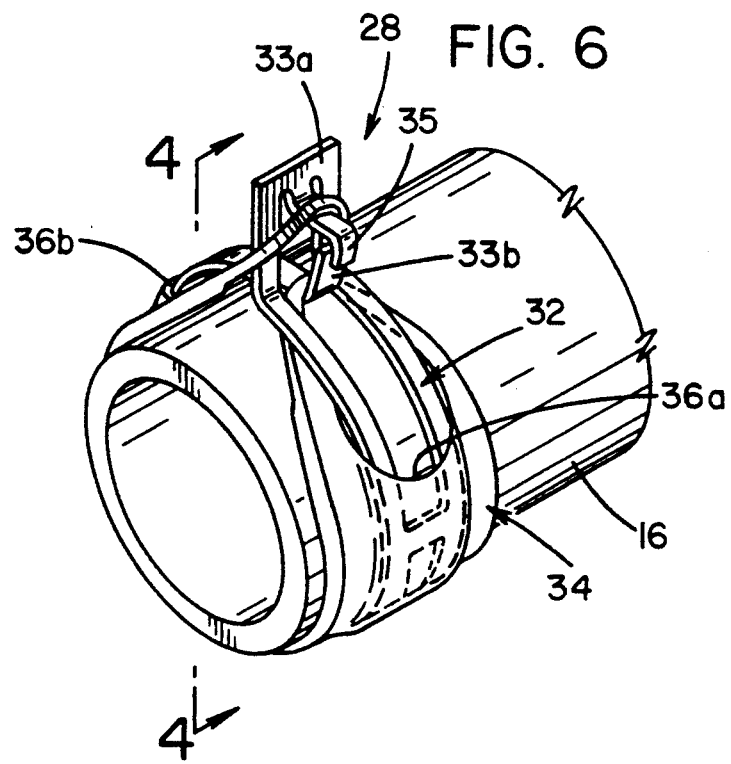

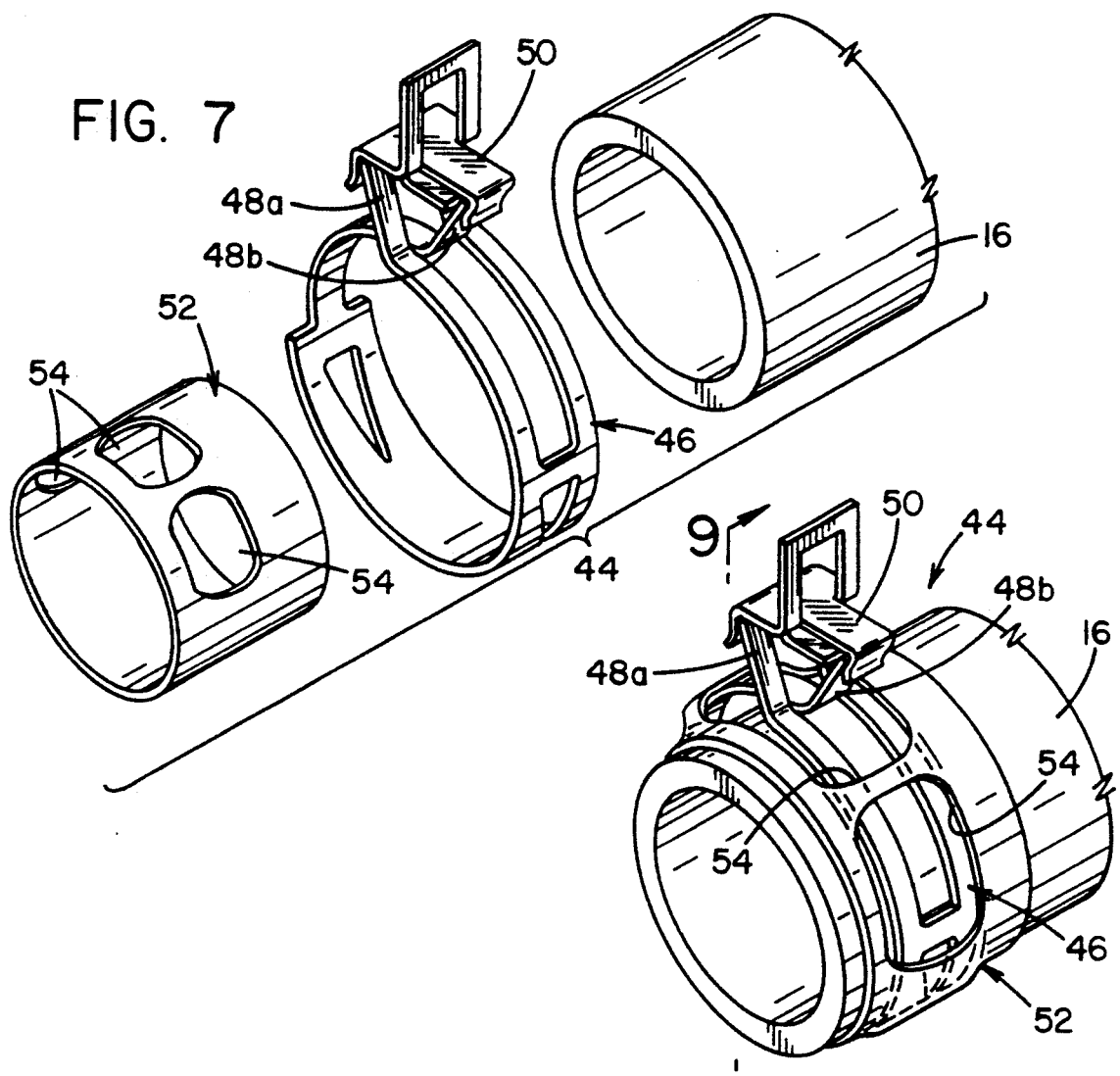
FIG. 7
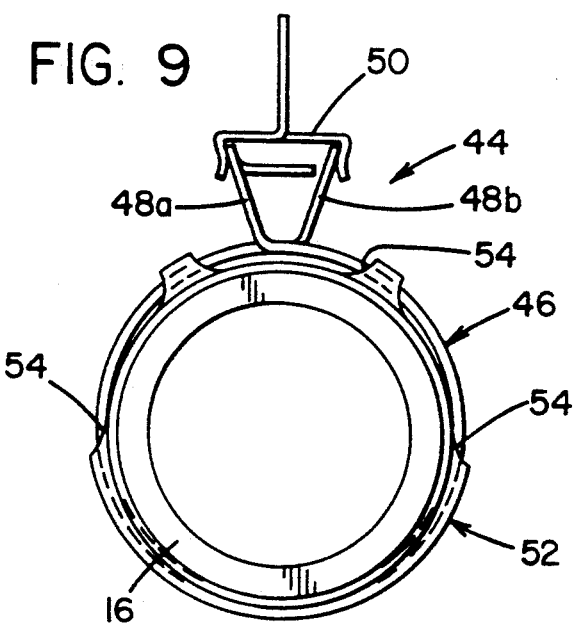
FIG. 8
FIG. 9

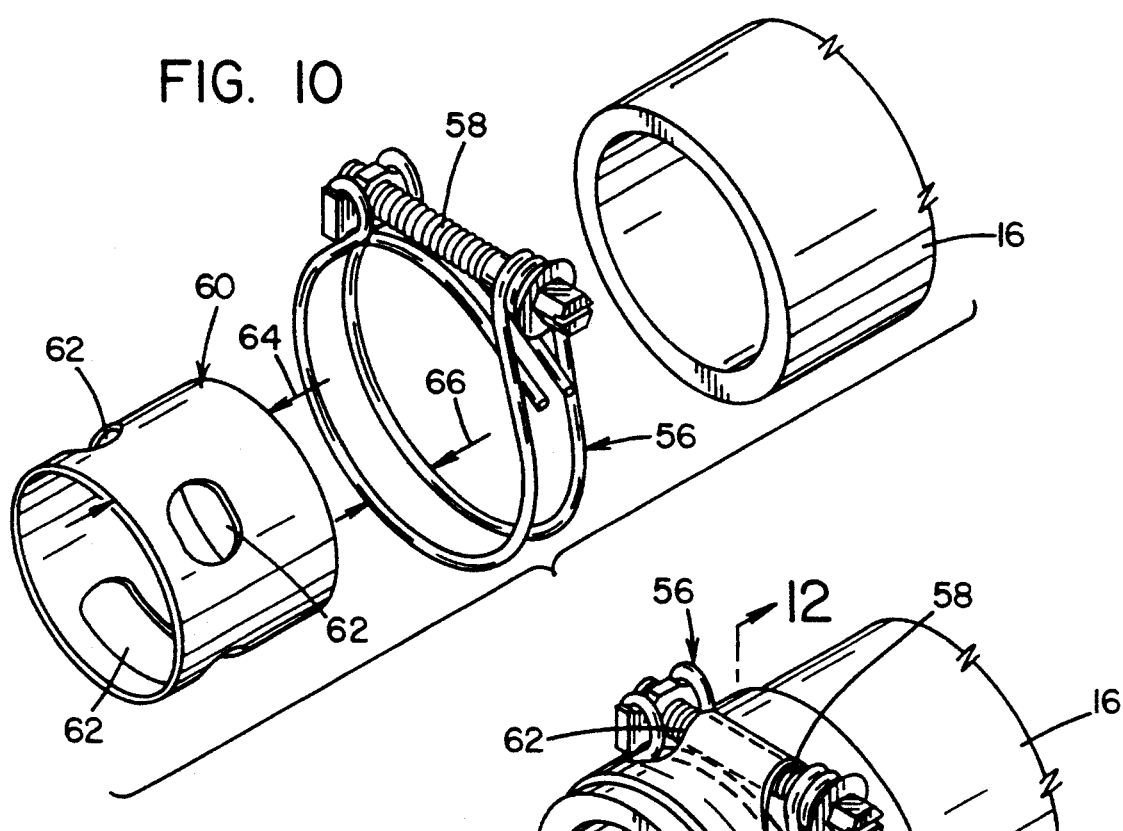
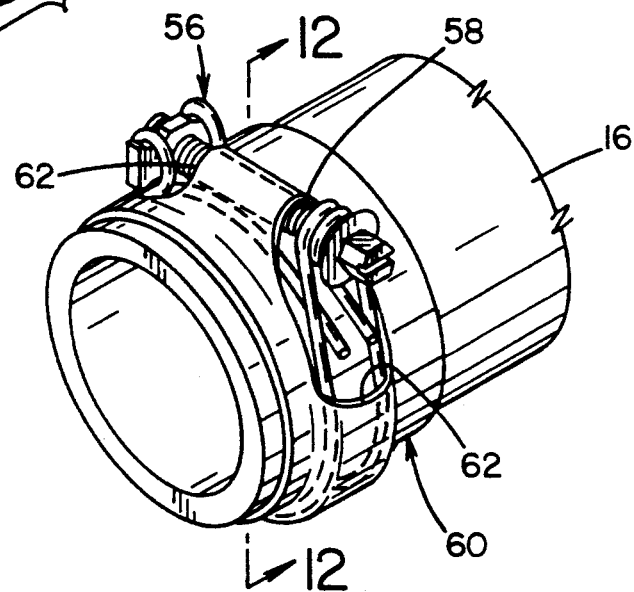
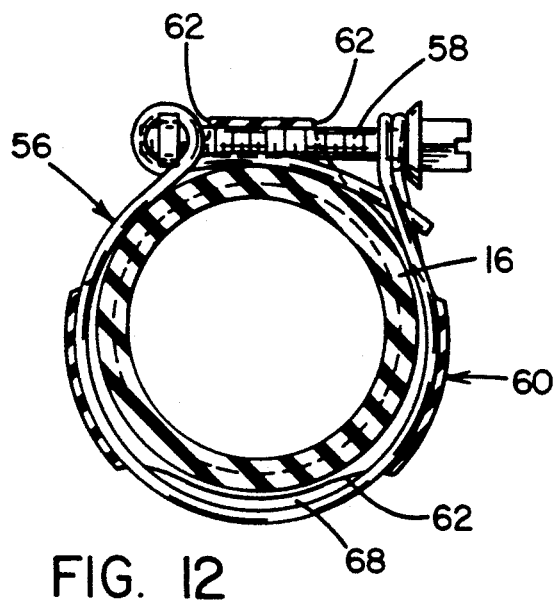
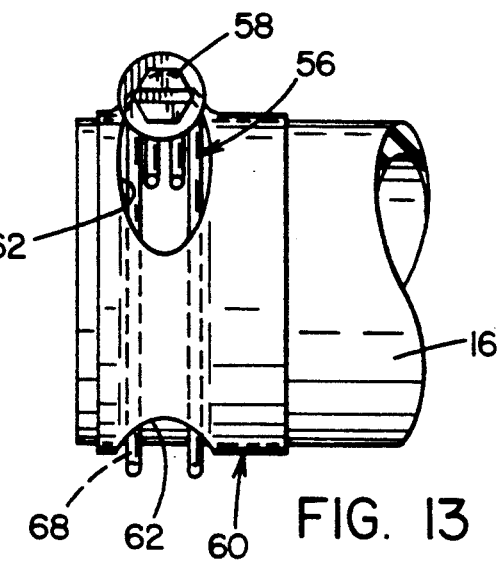

HOSE/CLAMP ASSEMBLY WITH RUBBER BAND HOLDER

FIELD OF THE INVENTION

This invention relates to hose/clamp assemblies. More particularly, it deals with a hose clamp which is held in its radially expanded or open position, located and oriented around a hose and secured to the hose.

BACKGROUND OF THE INVENTION

Various attempts have been made in the past to pre-assemble hose clamps on hoses. See, for example, U.S. Pat. No. 3,365,218 which describes and illustrates the use of a staple which penetrates into the hose. U.S. Pat. No. 4,882,814 shows the use of metallic retaining plates or arms. U.S. Pat. No. 5,002,094 employs a less than circumferential band of rubber which must be molded and vulcanized over a portion of the clamp. It is felt that this latter arrangement restricts the circumferential expansion of the hose and, thus, its assemblability over nipples in its end-use applications such as radiator and heater hoses in motor vehicle manufacturing.

There was, therefore, a need for a hose/clamp assembly which did not invade the integrity of the hose, provided positive retention of the clamp on the hose at a predetermined location and orientation and did not require additional operations such as molding and vulcanization.

According to the practice of the present invention, there is provided a hose/clamp assembly comprising:

a) a hose;

b) an annular hose clamp in its radially expanded open position placed around the hose in a predetermined location and orientation, and means for opening and closing; and c) a rubber band having at least one aperture therein, surrounding the entire circumference of said clamp and hose with said means for opening and closing extending through said at least one aperture.

It is preferred that the rubber band has an axial width which is greater than the axial width of whatever type of clamp being use.

BRIEF DESCRIPTION OF THE DRAWINGS

FIG. 5 is a perspective view, blown apart, of the components of a hose/clamp assembly, illustrating another embodiment of the invention.

FIG. 6 is a perspective view of the assembled components of FIG. 5.

FIG. 7 is a perspective view, blown apart, of the components of another embodiment of the present invention.

FIG. 8 is a perspective view of the assembled components of FIG. 7.

FIG. 9 is a cross-sectional view taken along line 9—9 of FIG. 8.

FIG. 10 is a perspective view, blown apart, of the components of another embodiment of the present invention.

FIG. 11 is a perspective view of the assembled components of the hose/clamp assembly of FIG. 10.

FIG. 12 is a cross-sectional view taken along line 12—12 of FIG. 11.

FIG. 13 is a side elevational view of the completed assembly of FIG. 11.

DETAILED DESCRIPTION OF THE INVENTION

Figure 1:
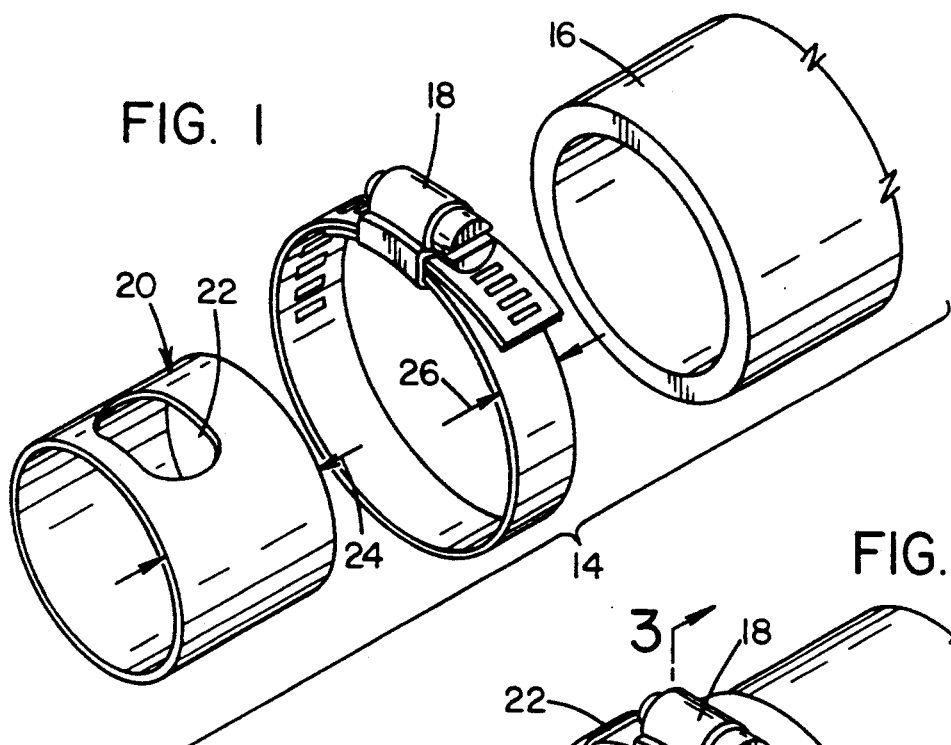
FIG. 1 is a perspective view, blown apart, of the components of a hose/clamp assembly.
Figure 2:
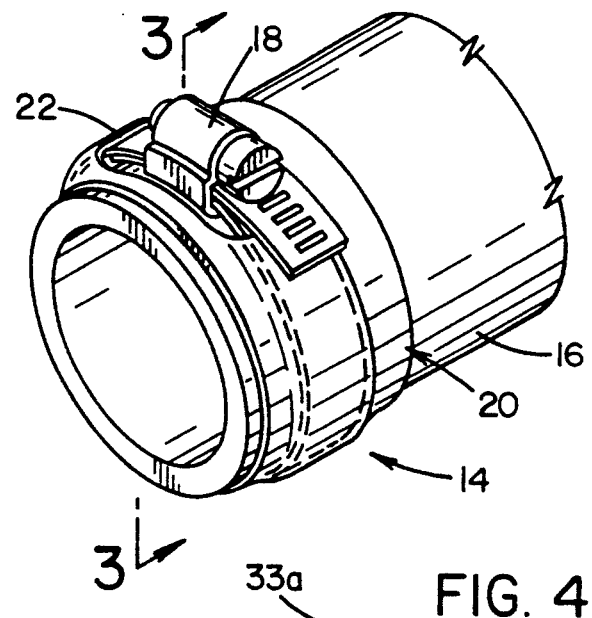
FIG. 2 is a perspective view illustrating the final assembly of the components of FIG. 1.
Figure 3:
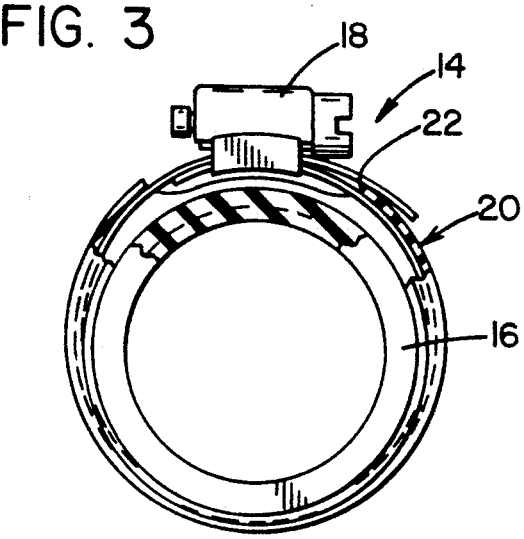
FIG. 3 is a cross-sectional view taken along line 3—3 of FIG. 2.
Figure 4:
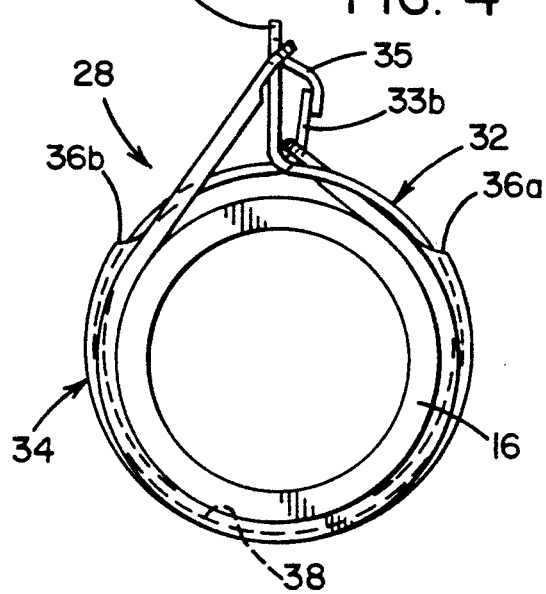
FIG. 4 is a cross-section view taken along line 4—4 of the hose/clamp assembly of FIG. 6.

FIG. 1 illustrates generally at 14 one embodiment of the present invention comprised of a hose 16, a hose clamp 18 and a rubber band 20 wherein the rubber band 20 has an aperture 22 therein. The width of the rubber band 24, in an axial direction, is greater than the width 26 of clamp 18. The clamp 18 is left in its open or untightened condition and located around the hose in a pre-determined orientation. The rubber band 20 is then stretched around the clamp such that the closing mechanism of the clamp 18 projects through the aperture 22 in the rubber band 20. The clamp 18 is left open enough to allow the hose 16 to stretch over any lip that may be present on the nipple of the component to which the hose assembly is to be attached. The completed assembly is shown in FIG. 2 wherein the band 20 surrounds the clamp 18 to prevent axial or circumferential movement and allows the closing mechanism to be operated after the insertion of the nipple into the hose.

FIG. 5 illustrates generally at 28 the components of another embodiment of a hose/clamp assembly of the present invention. Clamp 32, commonly known as a constant tension clamp, has a pair of tabs 33a and 33b which are held in their squeezed together open configuration by tang 35. Rubber band 34 has a pair of apertures 36a and 36b and a recess channel 38 whose width 42 is greater than the width 40 of clamp 32. To assemble this embodiment, tabs 33a and 33b are placed into one of the aperture 36 in rubber band 34. This has the effect that the outer portion of the aperture is retained on tab 35b. The clamp is then placed over hose 16 and the other aperture of rubber band 34 is brought around the clamp 32 and hose 16 to engage tab 33a and tang 35 as illustrated in FIG. 6. One advantage of this particular embodiment is that when the hose/clamp assembly is attached to a vehicle component by releasing tang 35 from tab 33b, the tensile forces from the stretched rubber band 34 are added to those of clamp 32 to provide a tighter fit.

FIG. 7 illustrates generally at 44 another embodiment of the present invention wherein clamp 46 is similar to clamp 32 in FIG. 5 having tabs 48a and 48b held in the opened position by clip 50. Rubber band 52 has three apertures 54. The completed assembly as shown in FIG. 8 is accomplished similarly to the embodiment shown in FIG. 2 wherein the clamp 46 is placed around and oriented on hose 16 and held in place by rubber band 52 having the tabs 48a and 48b as well as clip 50 protruding through one of the apertures 54. As can be well appreciated, the assembly of the hose onto a vehicle is accomplished by merely removing the clip 50 after the hose has been inserted over a nipple. It has been found that the additional apertures in band 52 has helped to reduce the amount of tension being asserted by the band on the hose in order to prevent the hose from going out of round which would, thus, make its installation more difficult.

FIG. 10 illustrates another embodiment of the present invention wherein clamp 56, commonly known as a two-wire clamp, has a screw 58 which is used to open and close the clamp. Rubber band 60 has three apertures 62. Band 60 has a width 64 which is greater than the width 66 of clamp 56. One of the apertures 62 of the rubber band 60 is located at what will be described for orientation purposes only at the bottom in order to allow the wires of clamp 56 to be assembled with a space 68 in order that the screw 58 is kept in contact with the hose to prevent movement of the screw during assembly operations at the vehicle manufactures.

While certain representative embodiments and details have been shown for the purpose of illustrating the invention, it will be apparent to those skilled in this art that various changes and modifications may be made therein without departing from the spirit or scope of the invention.

What is claimed is:

1. A hose/clamp assembly comprising:
   a) a hose;
   b) an annular hose clamp in its radially expanded open position placed around the hose in a predetermined location and orientation, and having means for opening and closing; and
   c) a rubber band having at least one aperture therein, surrounding the entire circumference of said clamp and hose with said means for opening and closing extending through said at least one aperture.

2. The hose/clamp assembly according to claim 1 wherein said rubber band has an axial width which is greater than an axial width of said clamp.

* * * * *